No. 759,921. PATENTED MAY 17, 1904.
F. C. RUSSELL.
BLANKET HOLDER.
APPLICATION FILED DEC. 22, 1903.

NO MODEL.

WITNESSES:
Joseph Hosler.
J. R. Bond.

INVENTOR
Frank C. Russell
BY J. W. Bond
ATTORNEY

No. 759,921. Patented May 17, 1904.

UNITED STATES PATENT OFFICE.

FRANK C. RUSSELL, OF CANTON, OHIO, ASSIGNOR TO AUGUST SCHOEN, WILLIAM GIBBS, AND CHARLES H. GIBBS, OF CANTON, OHIO.

BLANKET-HOLDER.

SPECIFICATION forming part of Letters Patent No. 759,921, dated May 17, 1904.

Application filed December 22, 1903. Serial No. 186,225. (No model.)

*To all whom it may concern:*

Be it known that I, FRANK C. RUSSELL, a citizen of the United States, residing at Canton, in the county of Stark and State of Ohio, have invented certain new and useful Improvements in Blanket-Holders; and I do hereby declare that the following is a full, clear, and exact description of the same, reference being had to the annexed drawings, making a part of this specification, and to the figures of reference marked thereon, in which—

Figure 1:
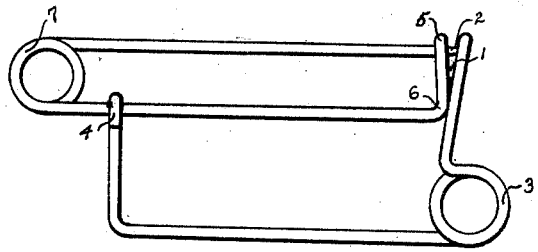
Figure 2:
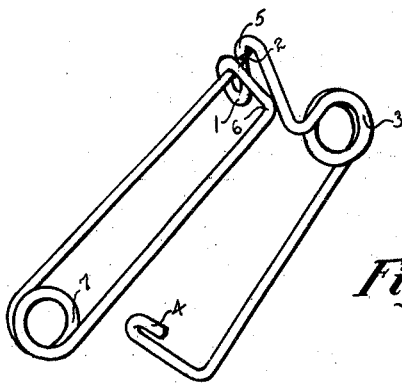
Figure 3:
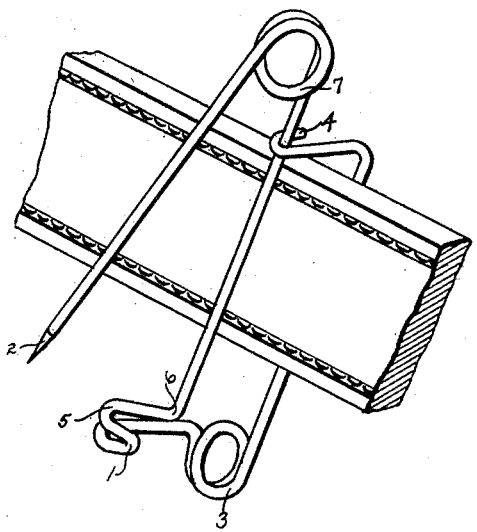

Figure 1 is a side elevation showing the holder closed. Fig. 2 is a perspective view showing the strap-connecting arm detached. Fig. 3 is a view showing the holder connected to a strap and the blanket-holder pin or portion open or freed.

The present invention has relation to blanket-holders especially designed to hold blankets placed upon animals, and especially horses, and to prevent the blankets when attached from becoming displaced by any cause.

Similar numerals of reference indicate corresponding parts in all the figures of the drawings.

In the accompanying drawings, 1 represents the point-guard, which is bent so that it will properly guard or protect the point 2 of the pin portion from the bend 1. The wire forming the body is straight for a short distance and is then bent into the loop or convolution 3, and from the convolution a wire is extended a desired distance and bent at right angles, or substantially so, and the end provided with the hook 4. The portion provided with said hook constitutes a trace-engaging element. The pin portion holding bend 5 is located adjacent to the point-guard 1 and the wire extended a short distance and bent at the point or near the point 6. The wire from this point is straight for a short distance, and at the end of this straight portion the convolution 7 is formed, from which convolution the wire is extended and provided with a point end, which constitutes the pin portion.

The entire device is formed of a single piece of spring-wire, and the portion of the wire between the convolution 3 and the hook 4 is for the purpose of providing a means for connecting the holder proper to a trace of a harness or other strap, as may be desired.

It will be understood that by detaching the hook 4 the holder can be quickly removed from the strap and again easily attached by connecting the hook to the wire portion of the body located between the bend at 6 and the convolution 7.

The pin portion of the holder can be easily and quickly passed through a blanket, and the said pin portion being so attached to a blanket can be connected to the holding-bend 5, thereby securely connecting the blanket to the holder and the holder to the harness or other article, by means of the hook 4.

It will be understood that the device here described should be formed of spring-wire and wire suitable for the purpose designed.

Having fully described my invention, what I claim as new, and desire to secure by Letters Patent, is—

As an improved article of manufacture, a blanket-holder formed of a single piece of wire bent to form a pin, a bar having at one end a guard for the point of said pin, and elastically connected at its other end with said pin in such manner as to tend to throw the point of said pin away from said bar, and a trace-engaging element spaced from said bar throughout its length and having a hooked end to removably engage said bar, and elastically connected to said bar at its pin-guard end in such manner as to tend to throw said hooked end away from said bar, substantially as specified.

In testimony that I claim the above I have hereunto subscribed my name in the presence of two witnesses.

FRANK C. RUSSELL.

Witnesses:
J. A. JEFFERS,
F. W. BOND.